(12) United States Patent
Bengala

(10) Patent No.: US 6,347,740 B1
(45) Date of Patent: Feb. 19, 2002

(54) METHOD AND MACHINE FOR READING AND ASSIGNING OPTICAL CODES

(75) Inventor: Moreno Bengala, San Lazzaro di Savena (IT)

(73) Assignee: Datalogic S.p.A. (IT)

( * ) Notice: Subject to any disclaimer, the term of this patent is extended or adjusted under 35 U.S.C. 154(b) by 0 days.

(21) Appl. No.: 09/000,651

(22) Filed: Dec. 30, 1997

(30) Foreign Application Priority Data

Dec. 30, 1996 (EP) .............................................. 96830663

(51) Int. Cl.[7] ................................................. G06K 7/10
(52) U.S. Cl. .............. 235/454; 235/462.01; 235/462.17
(58) Field of Search ................................. 235/454, 385, 235/459, 462.01, 462.08, 462.14, 462.17, 462.31, 475, 476, 382

(56) References Cited

U.S. PATENT DOCUMENTS

| | | | |
|---|---|---|---|
| 4,417,817 A | * 11/1983 | Bohme et al. .............. | 356/380 |
| 4,952,785 A | * 8/1990 | Kikuda ....................... | 235/432 |
| 5,252,814 A | 10/1993 | Tooley ........................ | 235/383 |
| 5,448,078 A | 9/1995 | Nakazawa .................. | 235/383 |
| 5,642,442 A | * 6/1997 | Morton et al. .............. | 382/287 |
| 5,684,288 A | * 11/1997 | Renvall .................. | 235/462.01 |
| 5,982,950 A | * 11/1999 | Shah et al. ................. | 382/282 |

FOREIGN PATENT DOCUMENTS

| | | | |
|---|---|---|---|
| DE | 3303109 | 8/1984 | |
| EP | 0115558 | 8/1984 | |
| EP | 0492410 | 7/1992 | |
| EP | 0565214 | 10/1993 | |
| EP | 0574017 | 12/1993 | |
| JP | 08105952 | 4/1996 | |
| JP | 08178620 | 7/1996 | |
| WO | 9918818 | * 4/1999 | ............ 235/462.01 |

OTHER PUBLICATIONS

European Search Report dated May 5, 1997 for Appln. No. EP 96 83 0663.

* cited by examiner

Primary Examiner—Michael G. Lee
Assistant Examiner—Daniel St. Cyr
(74) Attorney, Agent, or Firm—Hall, Priddy, Myers & Vande Sande

(57) ABSTRACT

A method and machine for reading and assigning optical codes to a succession of moving articles, each having at least one respective optical code, and the method including the steps of feeding the succession of articles, by means of a conveyor, through a read area; reading the optical codes within the read area by means of at least one optical reader, and determining, as each optical code is being read, the position in space of the optical code with respect to a given space reference; and assigning each optical code to the corresponding article by matching the position in space of the optical code with the position in space of the corresponding article.

7 Claims, 5 Drawing Sheets

METHOD AND MACHINE FOR READING AND ASSIGNING OPTICAL CODES

BACKGROUND OF THE INVENTION

The present invention relates to a method of reading and assigning optical codes, and in particular for reading and assigning optical codes to a succession of articles fed through a read area on a conveyor.

In the following description, the term "optical code" is intended to mean a set of graphic marks applied to a label or directly on the article (or any other support), and whereby information is coded in the form of a sequence of black and white or variously coloured regions arranged in one or more directions. Examples of such codes are bar codes, two-dimensional codes, colour codes, and others.

The present invention also relates to a machine for reading and assigning optical codes.

FIGS. 1 and 2 show a known machine for reading and assigning optical codes to a succession of moving articles A, each having a respective optical code on the top surface.

The machine comprises a belt conveyor C for feeding a succession of spaced articles A in a given direction on a conveying surface and through a read area defined by a portion of the conveying surface itself.

The machine also comprises a presence sensor S for detecting the entry of each article A inside the read area; a travel sensor E for monitoring the travel of articles A within the read area; and a measuring device M for determining, at the input of the read area, the height of each article A with respect to the conveying surface.

The machine also comprises a control unit U connected to presence sensor S, travel sensor E and measuring device M, and which provides for determining, with respect to a fixed reference and as a function of time, the distribution of articles A within the read area and in the traveling direction of articles A.

Finally, the machine also comprises a number of optical readers L, each of which is connected to control unit U, and is located over the read area to read the optical codes as they travel through.

More specifically, each optical reader L defines a respective scan line V on the conveying surface, and is able to read directly any optical codes which cross scan line V substantially parallel to the scan line. By means of a known reconstruction algorithm, each optical reader L is also able to read any optical codes which, on crossing scan line V, are so oriented as to form with the scan line an angle of maximum ±90°.

As each optical reader L is able to read optical codes oriented within an angle of maximum ±90° in relation to the respective scan line V, the optical readers L of the above known machine are arranged over the read area with scan lines V at different angles with respect to the traveling direction of articles A.

Scan lines V are so arranged within the read area as to cover the 360° required for any optical code traveling through the read area to be read by at least one optical reader L, so that the above machine comprises at least two optical readers L with their respective scan lines V perpendicular to each other.

On reading an optical code, each optical reader L supplies control unit U with the content of the optical code and the scan angle $\alpha$ of the optical code with respect to optical reader L; scan angle $\alpha$ being, at the instant the optical code is read, the angle between a reference ray R from optical reader L and intersecting scan line V, and a beam F emitted by optical reader L and intersecting the optical code.

In actual use, as belt conveyor C feeds spaced articles A continuously through the read area, presence sensor S and measuring device M respectively detect and communicate to control unit U the entry of each article A inside the read area and the height of article A with respect to the conveying surface.

On the basis of the information received from presence sensor S, measuring device M and travel sensor E, control unit U is able to determine, with respect to a fixed reference and as a function of time, the distribution of articles A within the read area.

As articles A travel through the read area, the optical codes are read by optical readers L, each of which communicates to control unit U the instant each optical code it succeeds in reading is read, and the relative scan angle $\alpha$. Since the sequence in which the optical codes are read within the read area depends substantially on how the optical codes are oriented and how scan lines V are arranged within the read area, the optical codes may be read in a different sequence from that in which articles A enter the read area, so that no definite time relationship exists between article A entering the read area and the optical code of article A being read. More simply, the order (sequence) in which the articles enter the read area may differ from the order (sequence) in which the respective optical codes are read.

As a result of this lack of synchronism between the two sequences, control unit U must follow a given assignment procedure to assign each optical code to respective article A.

The main drawback of the above machine lies in the procedure by which the optical codes are assigned to the respective articles, which is relatively complex and not altogether reliable.

Another drawback of the above machine is that, in certain operating conditions, it may not have all the information required to assign a given optical code. For example, in the event a relatively high and a relatively low article A are located too close together within the read area, the beam F emitted by optical reader L on detecting an optical code may intersect both articles A at the same time, so that scan angle $\alpha$ is no longer sufficient to determine which of the two articles A the optical code refers to, and the machine is subjected to the so-called "shadow effect."

Yet a further drawback of the above machine is that it is only capable of catering to substantially parallelepiped articles A.

SUMMARY OF THE INVENTION

It is an object of the present invention to provide a method of reading and assigning optical codes, designed to overcome the aforementioned drawbacks.

According to the present invention, there is provided a method of reading and assigning optical codes, characterized by comprising the steps of:

feeding through a read area a succession of articles, each having at least one respective optical code on at least one surface;

reading the optical codes on said articles within said read area by means of at least one optical reader;

determining the position in space of each optical code with respect to a given reference system; and assigning each optical code to the corresponding article.

More specifically, to dispense with said assignment procedure, the present invention proposes to eliminate the lack of synchronism between the sequence in which articles A enter the read area and the sequence in which the optical codes on articles A are read, by determining the position in space of the optical codes traveling through the read area. It should be stressed that knowing the position in space of an optical code also implies knowing the position in space of a given point of article A bearing the optical code.

In the above method, for each optical code, the step of reading the optical code is preferably substantially simultaneous with the step of determining the position in space of the optical code.

The step of determining the position in space of the optical code preferably comprises the substeps of:

determining, when reading the optical code, the distance of the optical code with respect to the optical reader taking the reading, and the scan angle between a first reference ray from the optical reader and a second ray joining the optical reader to the optical code; said distance and said scan angle being the polar coordinates of the optical code with respect to the optical reader by which the reading was taken; and converting the polar coordinates of the optical code into space coordinates associated with said given space reference.

According to the present invention, there is provided a machine for reading and assigning optical codes, and comprising a conveying device for feeding a succession of articles, each having at least one optical code on at least one surface, in a given traveling direction through a read area; measuring means for determining displacement of the articles in said direction; at least one optical reader located at said read area and for reading said optical codes; and a processing unit connected to said measuring means and to said optical reader; said machine being characterized in that said optical reader provides for determining, with respect to a given reference system, the position in space of each optical code as the optical code is being read.

The machine is preferably characterized by comprising at least two optical readers, each defining a respective scan line in said read area; the two optical readers are so arranged that the respective scan lines form respective different angles with said traveling direction of the articles; and the scan lines must be so arranged in the read area as to ensure that any optical code traveling through the read area is read by at least one optical reader.

The machine is preferably characterized by comprising detecting means connected to said processing unit, and for detecting the presence of the articles at a respective input of said read area. This solution enables the sequence in which articles A enter the read area to be so determined as to enable rapid assignment of the optical codes, and also provides for more effectively controlling articles A traveling through the read area. That is, any difference between the input sequence of articles A determined by the detecting means, and the output sequence of articles A and the respective optical codes detected by the optical readers, indicates malfunctioning of the machine.

BRIEF DESCRIPTION OF THE DRAWINGS

A non-limiting embodiment of the present invention will be described by way of example with reference to the accompanying drawings 3, 4 and 5, in which.

DETAILED DESCRIPTION OF THE INVENTION

Figure 1:
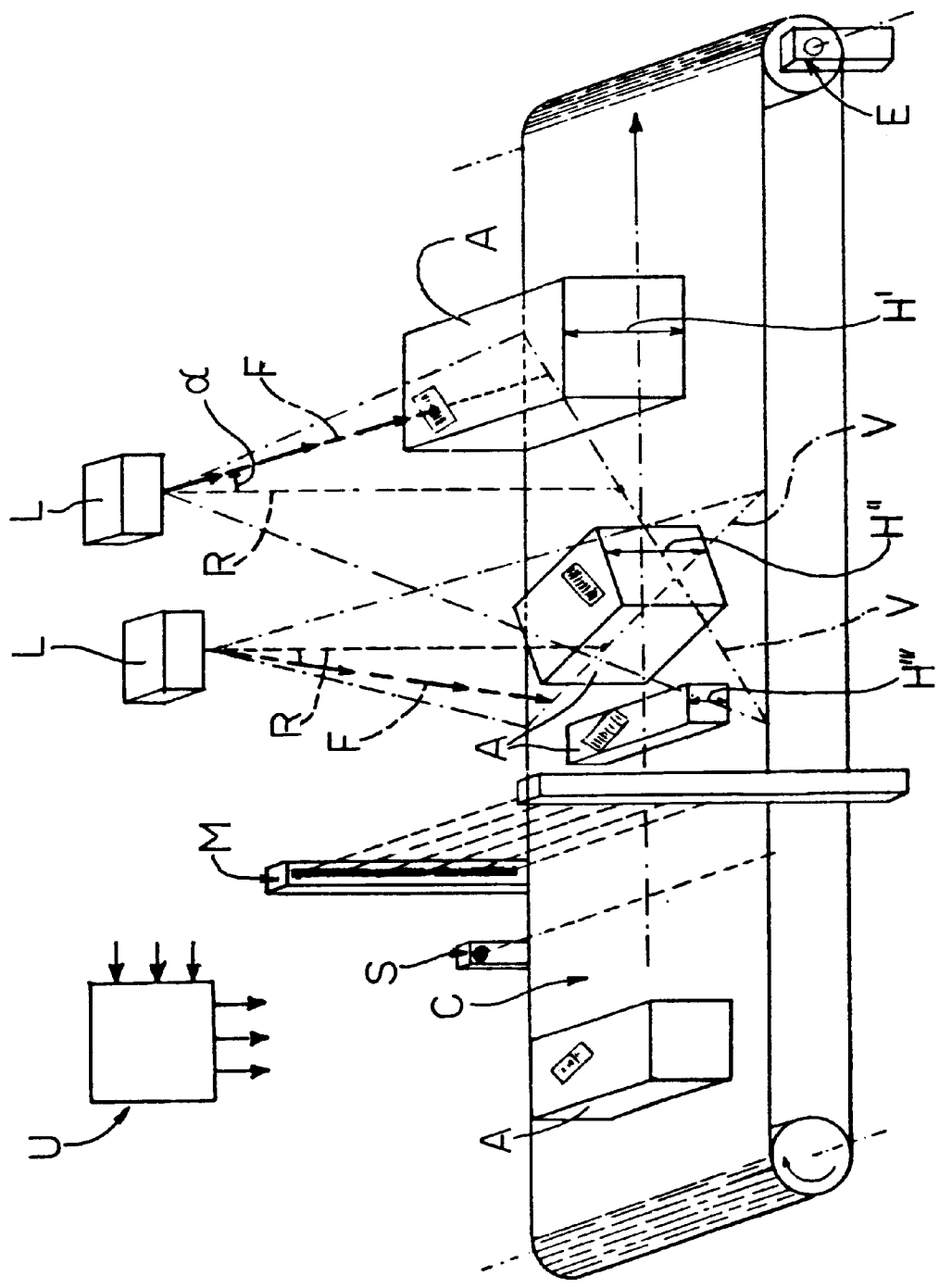
Figure 2:
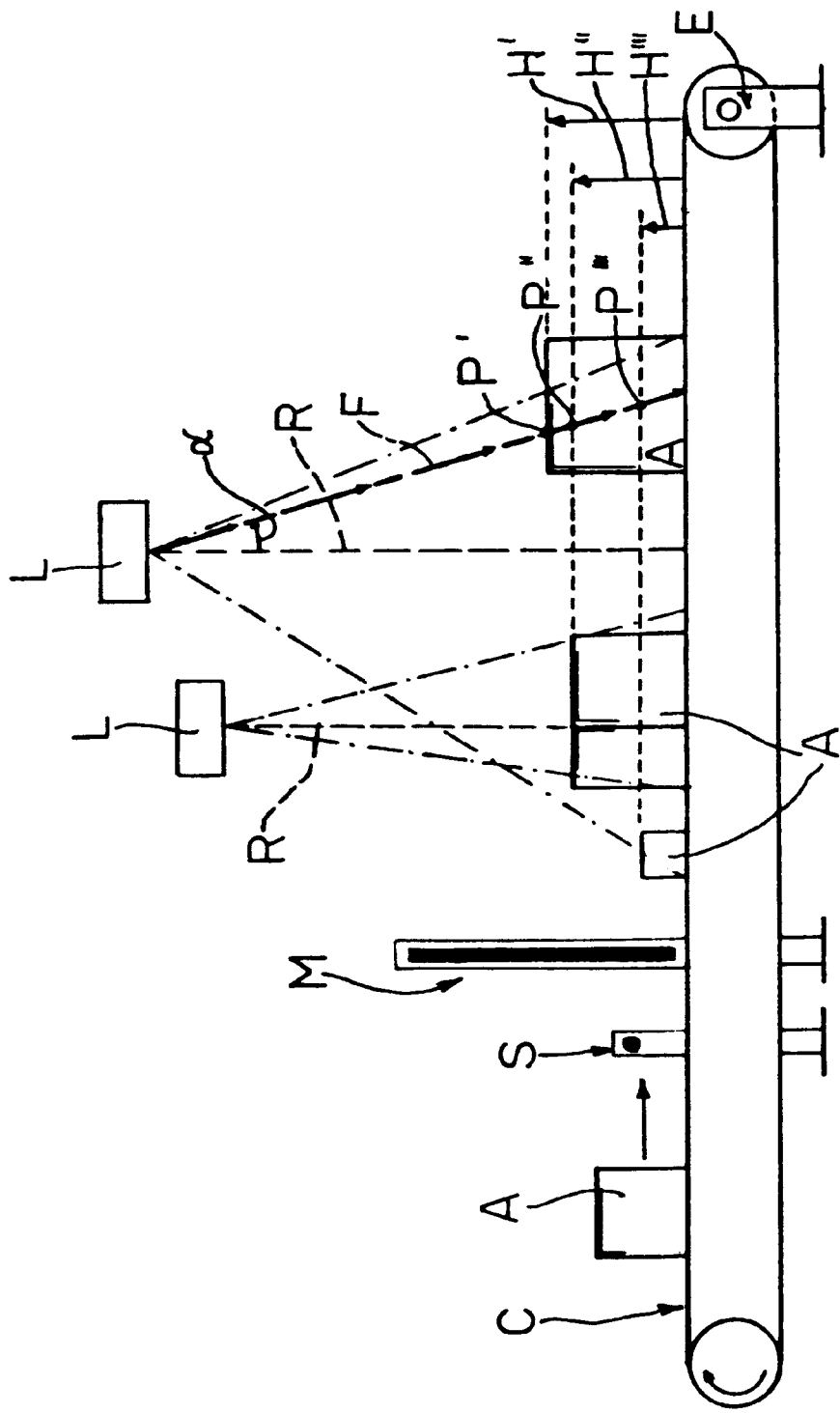
Figure 3:
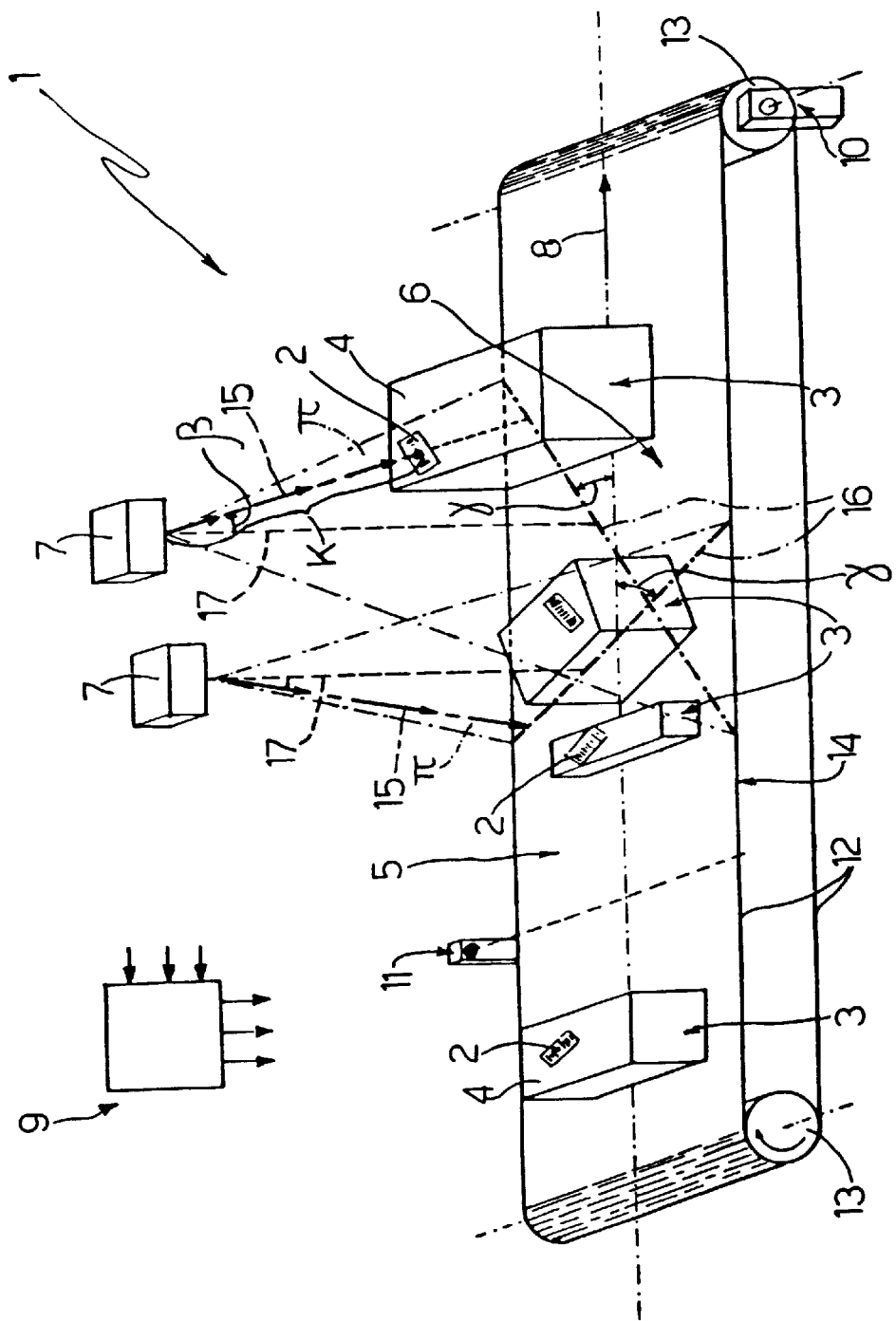
FIG. 3 shows a schematic view in perspective of a machine for reading optical codes in accordance with the teachings of the present invention.

Number 1 in FIG. 3 indicates a machine for reading and assigning optical codes 2 to a succession of moving articles 3, each having at least one respective optical code 2 on a respective surface 4.

The term "optical code" 2 is intended to mean a set of graphic marks applied to a label or directly on article 3 (or any other support), and whereby information is coded in the form of a sequence of black and white or variously coloured regions arranged in one or more directions. Examples of optical codes 2 are bar codes, two-dimensional codes and colour codes.

Machine 1 comprises a known conveyor 5 for conveying said succession of articles 3, spaced in relation to one another, on a conveying surface and through a read area 6 defined by a portion of the conveying surface itself; a number of optical readers 7 for reading optical codes 2, and each of which is located over read area 6 and provides for reading optical codes 2 traveling through read area 6 in a given direction 8; a processing and control unit 9 communicating with each optical reader 7; and a travel sensor 10 connected to processing unit 9, and for detecting the travel of articles 3 within and out of read area 6.

Finally, machine 1 may also comprise a presence sensor 11 (e.g. a photocell) located at the input of read area 6, and for communicating the presence of an article 3 at the input of read area 6 to processing unit 9. By means of sensors 10 and 11, processing unit 9 is able to determine the size of each article 3 in traveling direction 8, and to real-time process the distribution of articles 3 within read area 6 and in traveling direction 8 of articles 3.

More specifically, conveyor 5 comprises a belt 12 looped about a pair of pulleys 13, each rotating about a respective axis perpendicular to the traveling direction 8 of articles 3, and at least one of which is connected mechanically to a drive unit (not shown). Pulleys 13 define on belt 12 an upper branch 14, in turn defining said conveying surface on which articles 3 are preferably, but not necessarily, placed with respective surfaces 4 upwards.

In the example shown, travel sensor 10 is defined by a known encoder located at one of pulleys 13 of conveyor 5, and which communicates to processing unit 9 the travel of belt 12 in direction 8 of articles 3.

Optical readers 7 are of the type claimed in U.S. Pat. No. 5,483,051 filed by the present Applicant and granted on Jan. 9, 1996, and provide for scanning optical codes 2 within read area 6 by emitting a laser beam 15 onto conveyor 5, and sweeping beam 15 within a given plane angle. The plane angle within which laser beam 15 is moved defines a scan plane $\pi$, which intersects the conveying surface of articles 3 to define a scan line 16 substantially sloping at an angle $\gamma$ with respect to the traveling direction 8 of articles 3.

With reference to FIG. 3, each optical reader 7 is able to read directly any optical codes 2 which, on crossing scan line 16, are so oriented as to be substantially parallel to scan line 16; and, by means of an interpolation algorithm, each optical reader 7 is also able to read any optical codes which, on crossing scan line 16, are so oriented as to form with scan line 16 an angle of maximum ±90°.

Optical readers 7 of machine 1 are therefore so arranged over read area 6 that scan lines 16 form different angles $\gamma$ with respect to the traveling direction 8 of articles 3. More specifically, scan lines 16 are so arranged within read area 6 that any optical code 2 traveling through read area 6 is readable by at least one of optical readers 7.

When reading optical code 2, each optical reader 7 is able to determine the distance K between itself and the optical code 2 it is reading, and the scan angle β at which the reading is being made; the scan angle β (corresponding to state of the art scan angle α) being the angle between a fixed reference ray 17 lying on scan plane π (and corresponding to state of the art ray R), and the laser beam 15 (corresponding to state of the art beam F) emitted by optical reader 7 and intersecting the optical code 2 being read.

More specifically, each optical reader 7 is able to determine distance K and scan angle β of a given point of optical code 2 preferably, but not necessarily, located at the start of optical code 2.

In the example shown, scan plane π and reference ray 17 are perpendicular to the conveying surface of articles 3.

Figure 4:
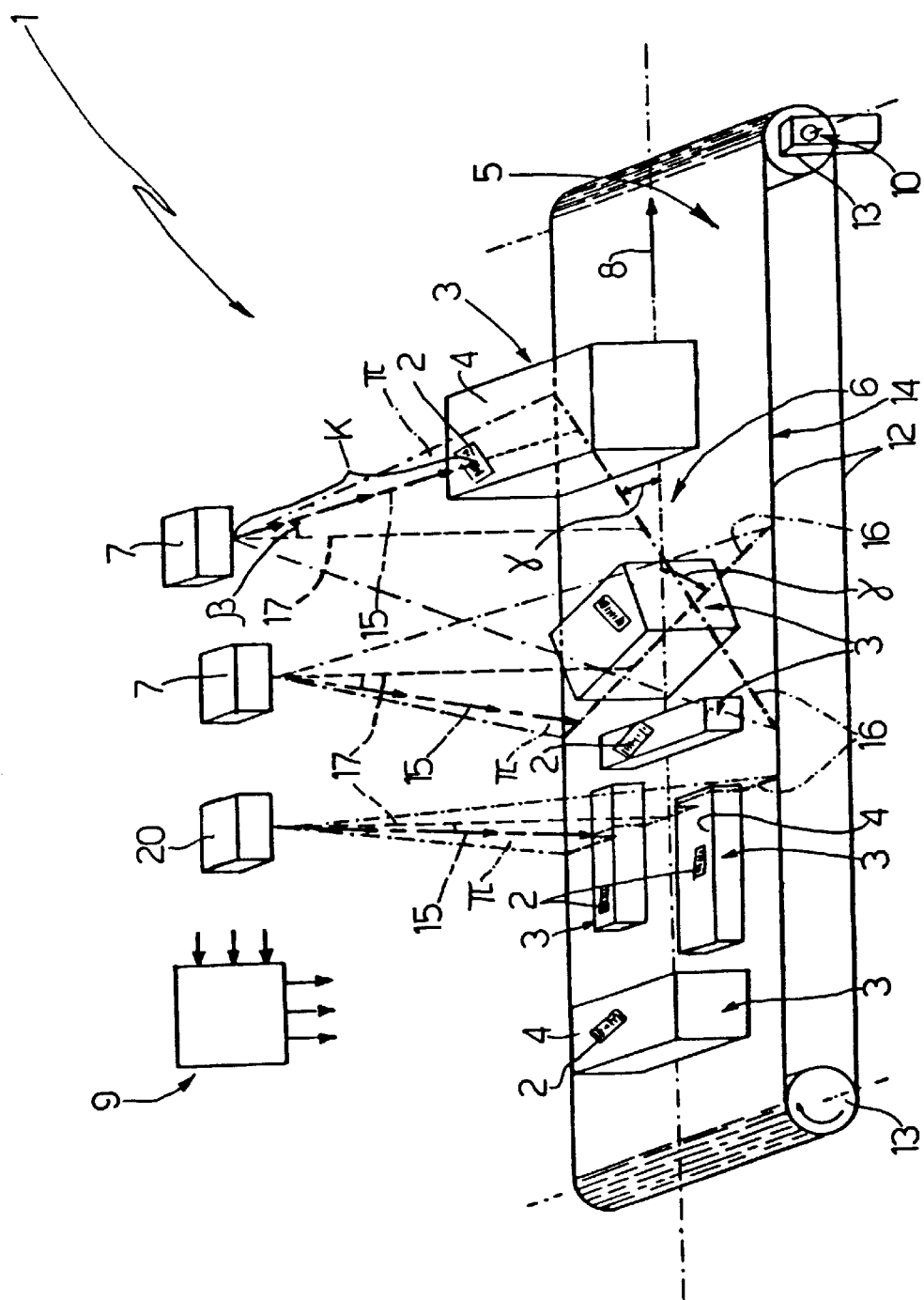
FIG. 4 shows a variation of the FIG. 3 machine.

In the FIG. 4 variation, as opposed to presence sensor 11, machine 1 comprises a further optical reader 20 of the type claimed in U.S. Pat. No. 5,483,051 filed by the present Applicant and granted on Jan. 9, 1996, and which is so arranged that scan line 16 is located at the input of read area 6 and perpendicular to the traveling direction 8 of articles 3.

In this case, optical reader 20 is able to determine, in real time and along scan line 16, the contour of articles 3 entering read area 6, thus enabling processing unit 9 to determine the volume and position of each article 3 on belt 12 at the input of read area 6, even in the event of a number of articles 3 entering read area 6 simultaneously or slightly offset in relation to each other, and so being "concealed" with respect to a presence sensor 11.

In the example shown, optical reader 20 detects and reads optical codes 2 in the same way as optical readers 7.

Operation of machine 1 will now be described assuming, for the sake of simplicity, that optical codes 2 traveling through read area 6 are detected and read by only one of optical readers 7 of machine 1.

If no presence sensor 11 is provided on machine 1, conveyor 5 feeds articles 3 through read area 6 in direction 8, while optical reader 7 searches for optical codes 2 traveling through read area 6.

On detecting and reading an optical code 2, optical reader 7 determines and communicates distance K and scan angle β to processing unit 9 together with the information contained in optical code 2.

Given the polar coordinates of optical code 2 with respect to optical reader 7, and given the position of optical reader 7 with respect to the conveying surface of articles 3, processing unit 9 is able to determine the position of optical code 2 with respect to the conveying surface at the instant in which the optical code is read.

It should be stressed that knowing the position of optical code 2 with respect to the conveying surface also implies knowing the position, with respect to the conveying surface, of a point of article 3 bearing optical code 2.

On determining the position of optical code 2, i.e. the position of a point of article 3 bearing optical code 2, at the instant in which it is read, processing unit 9 is able to follow the travel of optical code 2, and hence of article 3, in direction 8 using the information received from sensor 10 detecting the travel of belt 12.

Finally, on detecting an optical code 2, and hence a corresponding article 3, leaving read area 6, processing unit 9 assigns the information contained in the optical code 2 to that article 3.

If machine 1 is equipped with presence sensor 11 (FIG. 3), processing unit 9 is able to determine, as a function of time, the distribution of articles 3 within read area 6 and in direction 8 before optical codes 2 of articles 3 are detected and read by optical reader 7.

In this case, since the sequence in which articles 3 travel through read area 6 is known, processing unit 9 is able to assign each optical code 2 to the corresponding article 3 as soon as optical code 2 is read by optical reader 7.

Optical codes 2 are assigned to corresponding articles 3 by comparing the position in space of each optical code 2 at the instant in which it is read, with the distribution of articles 3 within read area 6 at the same instant, and by assigning optical code 2 to the article 3 occupying the same position in space as optical code 2 at the instant in which it was read.

If presence sensor 11 is provided (FIG. 3), processing unit 9 determines the size of each article 3 by determining, by means of sensor 10, the travel of belt 12 within the time interval in which sensor 11 indicates the presence of article 3 at the input of read area 6. Sensor 11, in fact, indicates to processing unit 9 when the front and rear ends of each article 3 enter read area 6 in the traveling direction 8 of articles 3.

If machine 1 is equipped with optical reader 20 (FIG. 4), processing unit 9 is able to determine the volume of each article 3 and the arrangement of articles 3 within read area 6 as a function of time, thus enabling correct assignment of the read optical codes 2, even in the event of a number of articles 3 entering read area 6 simultaneously or slightly offset in relation to one another.

Optical codes 2 are assigned to respective articles 3 in the same way as described with reference to machine 1 equipped with presence sensor 11.

In this case, however, as processing unit 9 is able to determine the arrangement of articles 3 within read area 6, articles 3 entering read area 6 need not necessarily be spaced in relation to one another.

Figure 5:
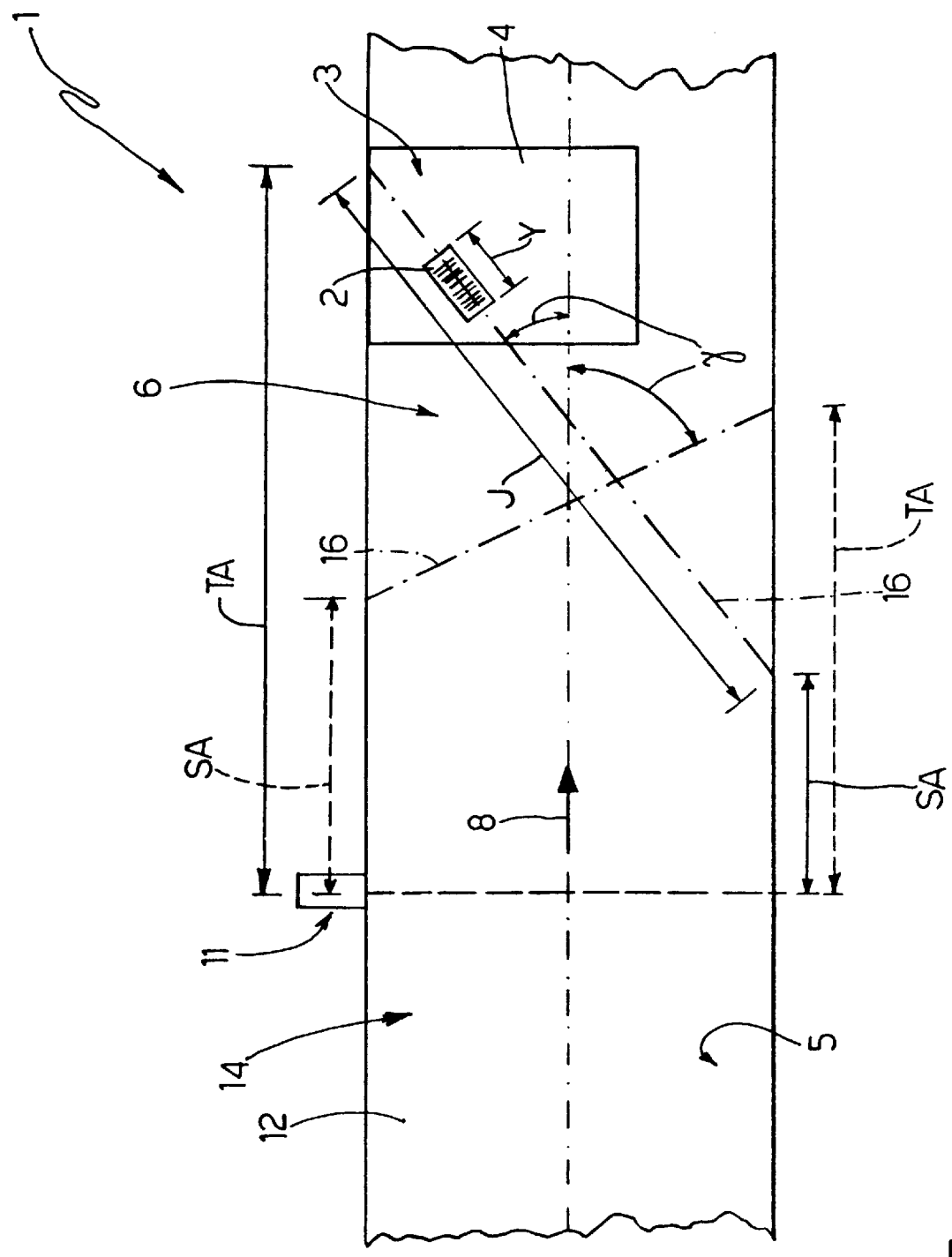
FIG. 5 shows a plan view, with parts removed for clarity, of the FIG. 3 machine in a particular operating condition.

With reference to FIG. 5, experiments have shown that, to reliably determine distance K between the optical reader 7 taking the reading and the optical code 2 being read, optical code 2 must be sampled at least twice per scan.

Assuming, therefore, the smallest possible size and the worst possible location of optical code 2 on the conveying surface (i.e. an optical code 2 of the smallest size readable and located at a maximum distance from optical reader 7), optical reader 7 must be able to make, along scan line 16, a minimum number of samples Nc equal to $[(J/Y*2]$, where J is the length of scan line 16 on the conveying surface, and Y is the minimum dimension of optical code 2 parallel to scan line 16.

To determine distance K, each optical reader 7 comprises a laser emitting/receiving device generating an analog signal substantially proportional to distance K between optical reader 7 and the optical code 2 illuminated by laser beam 15; and a high-frequency (e.g. 20 MHz) analog-digital converter for sampling said analog signal and supplying a number of samples Nu greater than that required for reliably measuring distance K (Nu>Nc).

To obtain the minimum number of samples Nc, only some of the samples supplied by the analog-digital converter need therefore be acquired, so that the frequency Fc at which the samples supplied by the analog-digital converter are acquired and memorized is necessarily less than that at which the analog signal is sampled by the analog-digital converter. If T is the time interval in which laser beam 15 scans line 16, acquisition time Tc therefore equals:

$$Tc=T/Nc=T/[(J/Y)*2]$$

and acquisition frequency Fc equals:

$$Fc=1/Tc=[(J/Y)*2]/T$$

Each optical reader 7 also comprises a decoding device for decoding optical codes 2, and which provides for decoding the optical code 2 detected along scan line 16 before laser beam 15 finishes scanning line 16, and also for supplying the scan angle β of the decoded optical code 2, i.e. the angle at which laser beam 15 detects the start of optical code 2.

As the traveling speed of articles 3 is several orders of magnitude less than the speed at which laser beam 15 is swept along scan line 16 by optical reader 7, the position of optical code 2 may reasonably be assumed to be unchanged at the next scan following that in which optical code 2 is decoded. As such, at the next scan following that in which optical code 2 is decoded, the output values of the analog-digital converter are memorized at frequency Fc, and the value of distance K to be assigned to optical code 2 is stored in a given storage location corresponding to scan angle β.

To make the best use of optical readers 7, therefore, scan line 16 is preferably, but not necessarily, defined by the lateral edges of branch 14 of belt 12, in which case, the two rays from optical reader 7 and defining scan plane π must intersect the conveying surface of articles 3 at said lateral edges of branch 14 of belt 12.

Finally, to correctly determine when each article 3 exits read area 6, read area 6 must terminate downstream from the last scan line 16 encountered by each article 3 traveling in direction 8. If presence sensor 11 is provided, the length of read area 6 is preferably, but not necessarily, equal to [(TA(max)−SA(min)], where TA(max) indicates the greater of distances TA, SA(min) indicates the lesser of distances SA, and TA and SA respectively indicate, for each scan line 16, the maximum and minimum distance from the position of sensor 11.

The main advantage of the method and machine 1 described above lies in reading optical code 2 at the same time the presence of article 3 bearing the optical code is detected, thus enabling optical code 2 to be assigned immediately to respective article 3 with no risk of error. The solution described therefore provides for dispensing with the assignment procedure typical of known machines, while at the same time ensuring total reliability.

Further advantages are derived from the fact that machine 1 is not subject to the so-called "shadow effect" typical of known machines, and provides for catering to articles 3 of any shape.

Another advantage is that machine 1 is cheaper to produce by dispensing with the measuring device M typical of known machines.

And finally, in the event optical reader 20 is provided, another advantage lies in the possibility of supplying a number of articles 3 simultaneously to the input of read area 6.

Clearly, changes may be made to the method and machine 1 as described and illustrated herein without, however, departing from the scope of the present invention.

What is claimed is:

1. A method of reading and assigning optical codes, characterized by comprising the steps of:
   feeding through a read area a succession of articles, each having at least one respective optical code on at least one surface;
   reading the optical codes on said articles within said read area by means of at least one optical reader;
   determining the position in space of each optical code with respect to a given reference system; and
   assigning each optical code to the corresponding article;
   wherein, for each optical code, said step of assigning the optical codes comprises the substeps of:
      determining, after the optical code is read, the displacement, as a function of time, of the optical code and corresponding article within said read area;
      determining, on the basis of the displacement of the article and corresponding optical code, the position in space of the optical code and corresponding article with respect to said given reference system; and
      assigning the optical code leaving said read area to the article also leaving the read area.

2. A method of reading and assigning optical codes, characterized by comprising the steps of:
   feeding through a read area a succession of articles, each having at least one respective optical code on at least one surface;
   reading the optical codes on said articles within said read area by means of at least one optical reader;
   determining the position in space of each optical code with respect to a given reference system; and
   assigning each optical code to the corresponding article;
   wherein said method further includes, between said step of feeding said articles and said step of reading said optical codes, a step of detecting entry of said articles into said read area, to determine, as a function of time, the distribution of said articles within said read area.

3. The method as claimed in claim 2, wherein, for each article, said step of detecting the entry of the articles into the read area comprises the substeps of:
   determining the entry into said read area of the front end of the article in a traveling direction of the articles;
   determining the entry into said read area of the rear end of the article in said traveling direction;
   determining a size of the article in the traveling direction of the articles; and
   determining, with respect to said given reference system, successive displacements of the article within said read area and in said traveling direction.

4. The method as claimed in claim 3, wherein, for each optical code, said step of assigning said optical codes comprises the substeps of:
   determining the distribution of the articles within said read area at the instant in which the optical code is read;
   determining, with reference to said distribution, which of said articles occupied the same position in space as said optical code; and
   assigning said optical code to the article which occupied the same position in space.

5. The method as claimed in claim 2, wherein, for each article, said step of determining the entry of the articles into the read area comprises the substeps of:
   determining the number of articles entering said read area and the respective volumes; and
   determining, with respect to said given reference system, successive displacements of the article within said read area and in said traveling direction.

6. A machine for reading and assigning optical codes comprising a conveying device for feeding a succession of articles, each article having at least one optical code on at least one surface, in a given traveling direction through a read area; measuring means for determining displacement of the articles in said direction; at least one optical reader located at said read area and for reading said optical codes; and a processing unit connected to said measuring means and to said optical reader; said machine being characterized in that said optical reader determines, with respect to a given reference system, the position in space of each optical code as the optical code is being read;

wherein said machine further comprises detecting means including a presence sensor, said detecting means being connected to said processing unit for detecting the presence of said articles at a respective input of said read area; wherein said presence sensor is located at the input of said read area, and wherein by utilizing said presence sensor said processing unit determines, as a function of time, the distribution of the articles within said read area and in said traveling direction.

7. A machine for reading and assigning optical codes comprising a conveying device for feeding a succession of articles, each article having at least one optical code on at least one surface, in a given traveling direction through a read area; measuring means for determining displacement of the articles in said direction; at least one optical reader located at said read area and for reading said optical codes; and a processing unit connected to said measuring means and to said optical reader; said machine being characterized in that said optical reader determines, with respect to a given reference system, the position in space of each optical code as the optical code is being read;

wherein said machine further comprises detecting means including an optical reader, said detecting means being connected to said processing unit for detecting the presence of said articles at a respective input of said read area; wherein said optical reader is located at the input of said read area, and wherein by utilizing said optical reader, said processing unit determines the volume of each article and the distribution of the articles on said conveying device and within said read area as a function of time.

* * * * *